Figure 1:
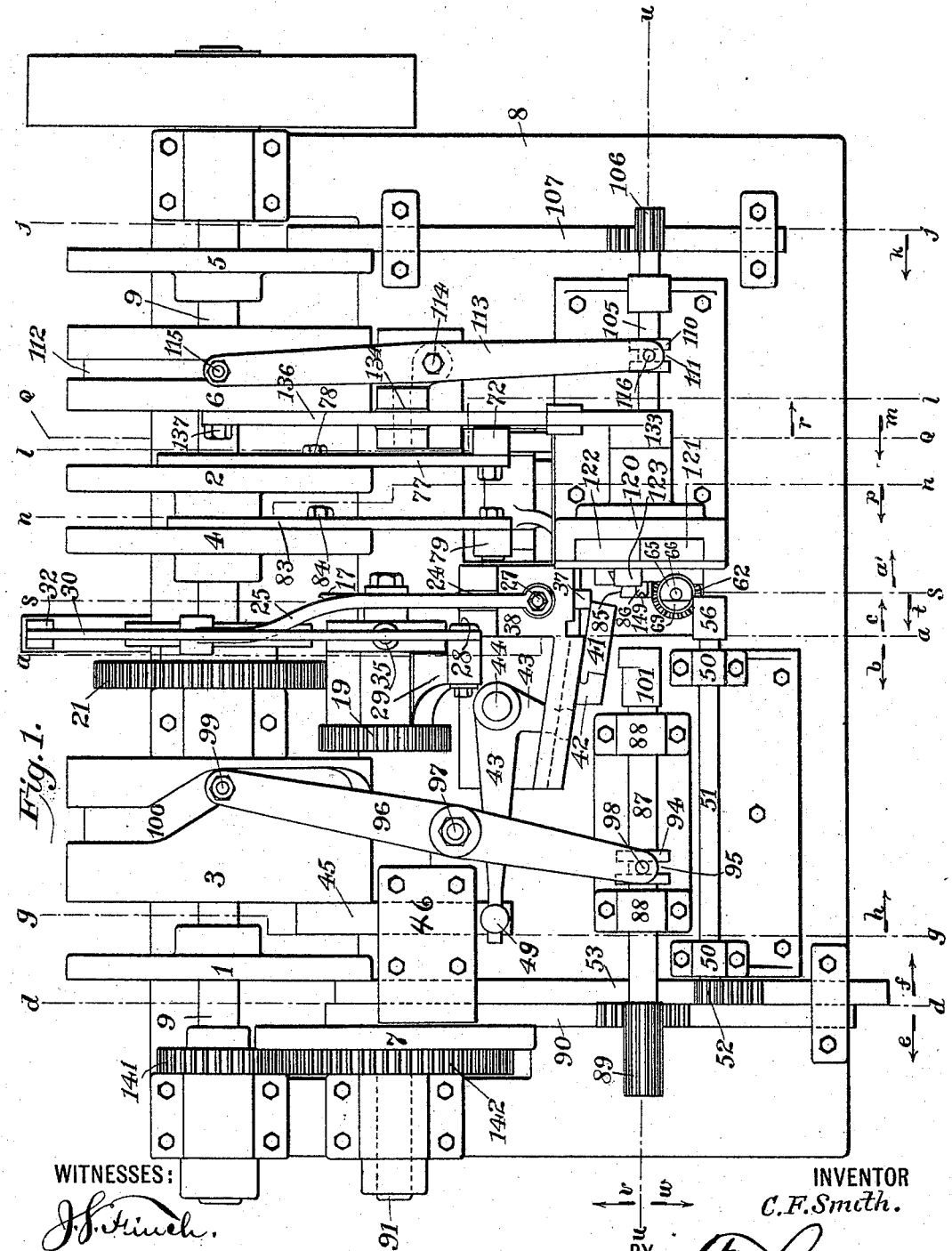

(No Model.) 18 Sheets—Sheet 1.
C. F. SMITH.
MACHINE FOR AUTOMATICALLY MAKING WIRE CHAIN.
No. 537,863. Patented Apr. 23, 1895.

WITNESSES:
J. F. Finch.
M. S. Longdee.

INVENTOR
C. F. Smith.
BY
[signature]
ATTORNEY (No Model.)  
18 Sheets—Sheet 2.

C. F. SMITH.
MACHINE FOR AUTOMATICALLY MAKING WIRE CHAIN.

No. 537,863.  
Patented Apr. 23, 1895.

*Fig. 2.*

WITNESSES:  
J. F. Finch  
M. S. Lougden

INVENTOR  
C. F. Smith  
BY  
ATTORNEY (No Model.)

C. F. SMITH.
MACHINE FOR AUTOMATICALLY MAKING WIRE CHAIN.

No. 537,863. Patented Apr. 23, 1895.

WITNESSES:
J. F. Finch.
M. S. Lougden.

INVENTOR
C. F. Smith.
BY
ATTORNEY (No Model.) 18 Sheets—Sheet 4.

C. F. SMITH.
MACHINE FOR AUTOMATICALLY MAKING WIRE CHAIN.

No. 537,863. Patented Apr. 23, 1895.

WITNESSES:

INVENTOR
C. F. Smith.
BY
ATTORNEY

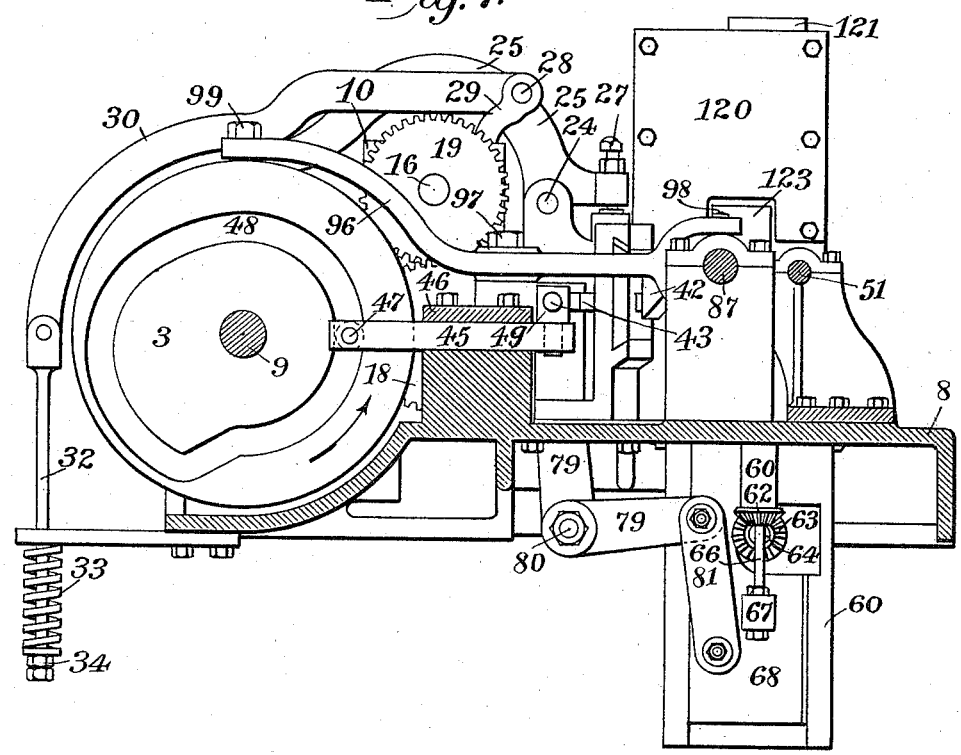
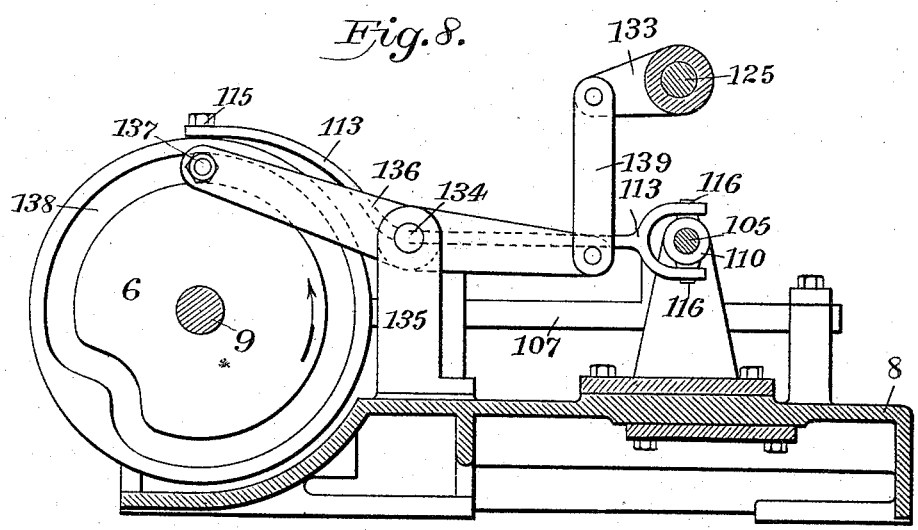

(No Model.) 18 Sheets—Sheet 6.

C. F. SMITH.
MACHINE FOR AUTOMATICALLY MAKING WIRE CHAIN.

No. 537,863. Patented Apr. 23, 1895.

WITNESSES:
INVENTOR
C. F. Smith
BY
ATTORNEY (No Model.)
18 Sheets—Sheet 7.
C. F. SMITH.
MACHINE FOR AUTOMATICALLY MAKING WIRE CHAIN.
No. 537,863. Patented Apr. 23, 1895.
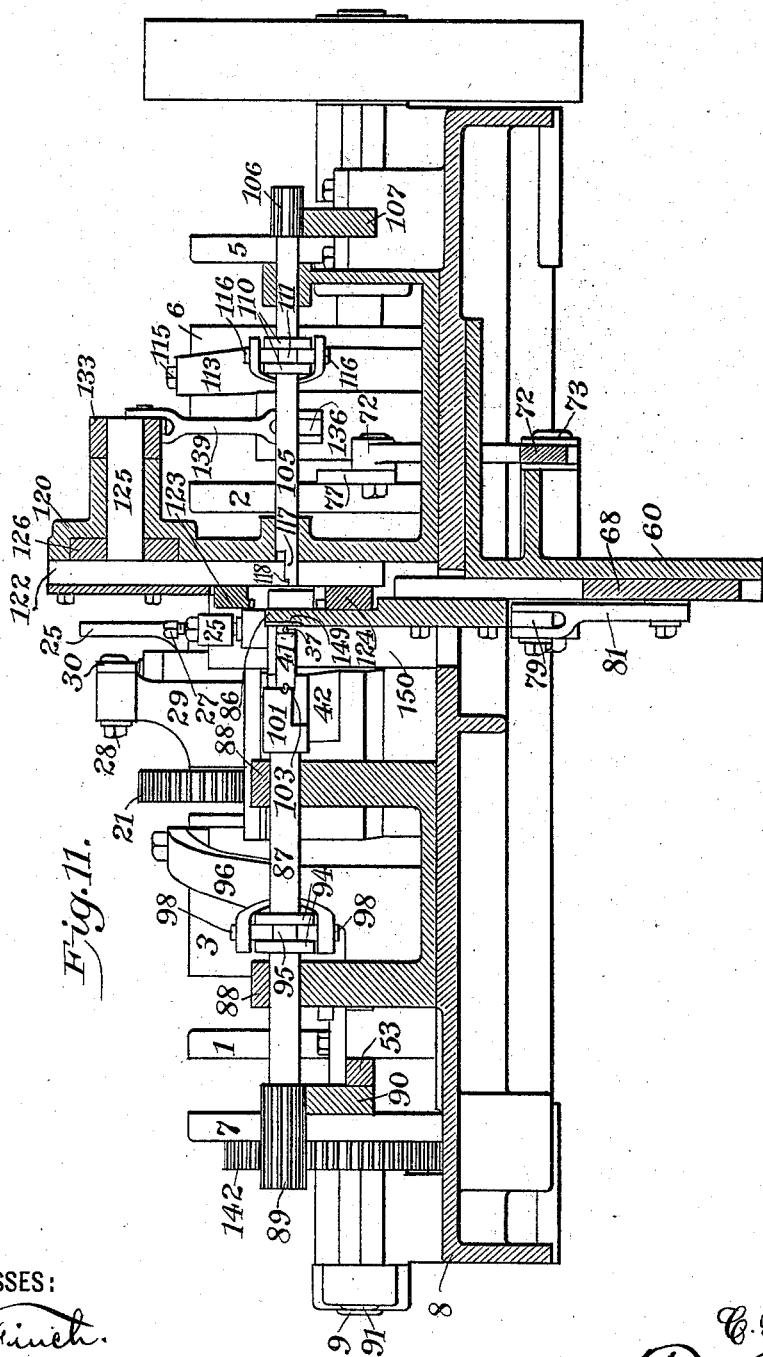
WITNESSES:
INVENTOR
C. F. Smith
BY 
ATTORNEY (No Model.) 18 Sheets—Sheet 8.

C. F. SMITH.
MACHINE FOR AUTOMATICALLY MAKING WIRE CHAIN.

No. 537,863. Patented Apr. 23, 1895.

WITNESSES:

INVENTOR
C. F. Smith.
BY
ATTORNEY (No Model.) 18 Sheets—Sheet 9.
C. F. SMITH.
MACHINE FOR AUTOMATICALLY MAKING WIRE CHAIN.
No. 537,863. Patented Apr. 23, 1895.
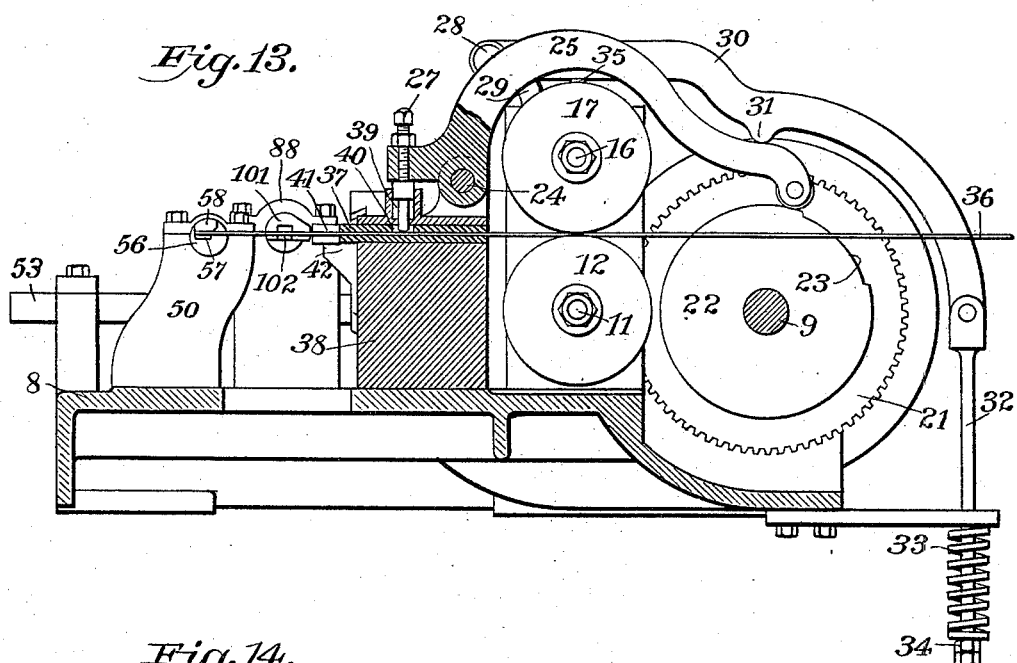
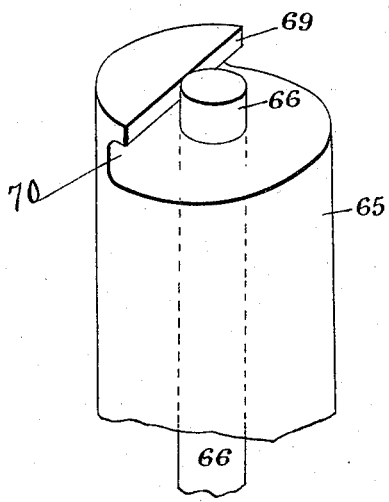
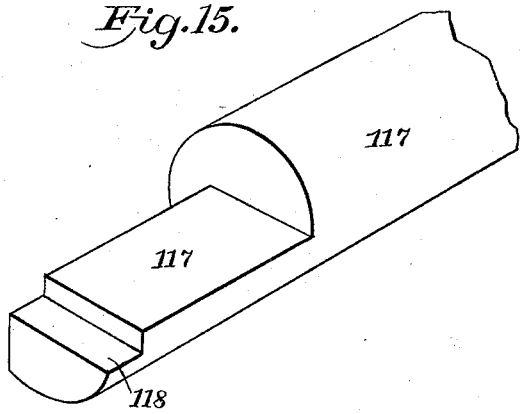
WITNESSES:
INVENTOR
C. F. Smith.
BY
ATTORNEY (No Model.) 18 Sheets—Sheet 10.
C. F. SMITH.
MACHINE FOR AUTOMATICALLY MAKING WIRE CHAIN.
No. 537,863. Patented Apr. 23, 1895.
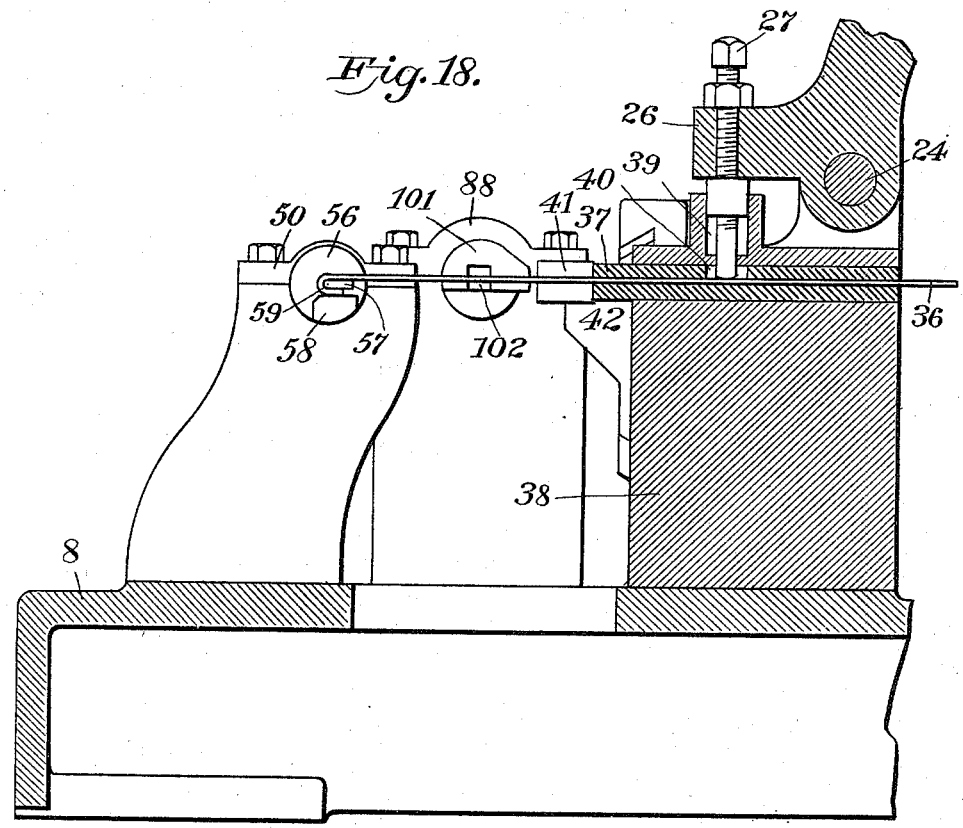
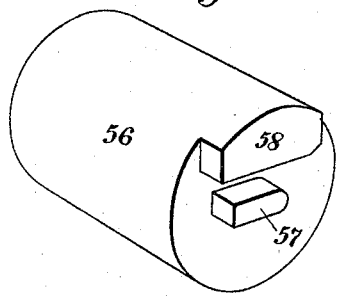
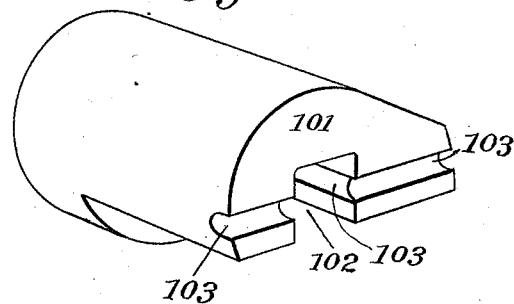
WITNESSES:
INVENTOR
C. F. Smith
BY
ATTORNEY (No Model.)  18 Sheets—Sheet 11.
C. F. SMITH.
MACHINE FOR AUTOMATICALLY MAKING WIRE CHAIN.
No. 537,863. Patented Apr. 23, 1895.
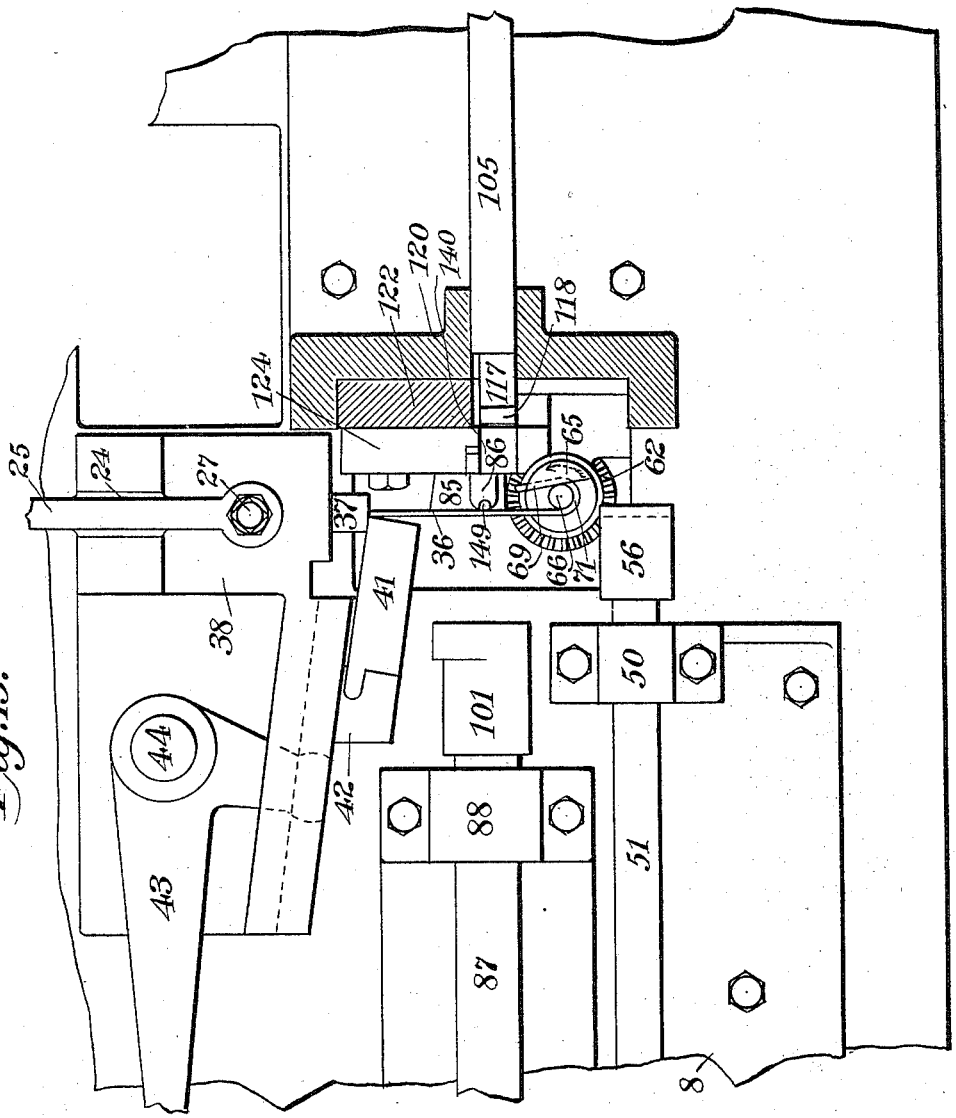
WITNESSES:
INVENTOR
C. F. Smith
BY
ATTORNEY (No Model.) 18 Sheets—Sheet 12.
C. F. SMITH.
MACHINE FOR AUTOMATICALLY MAKING WIRE CHAIN.
No. 537,863. Patented Apr. 23, 1895.
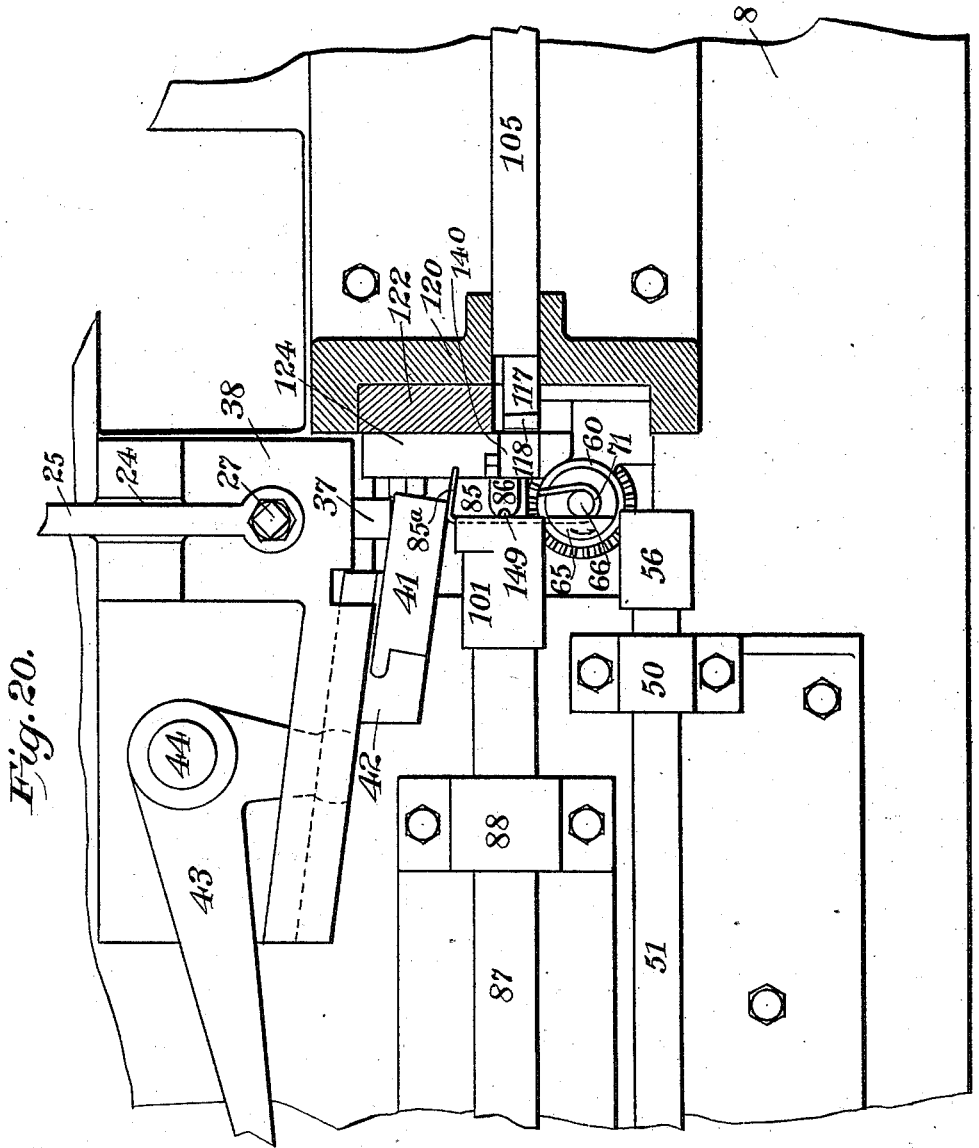
WITNESSES:
INVENTOR
C. F. Smith.
BY
ATTORNEY

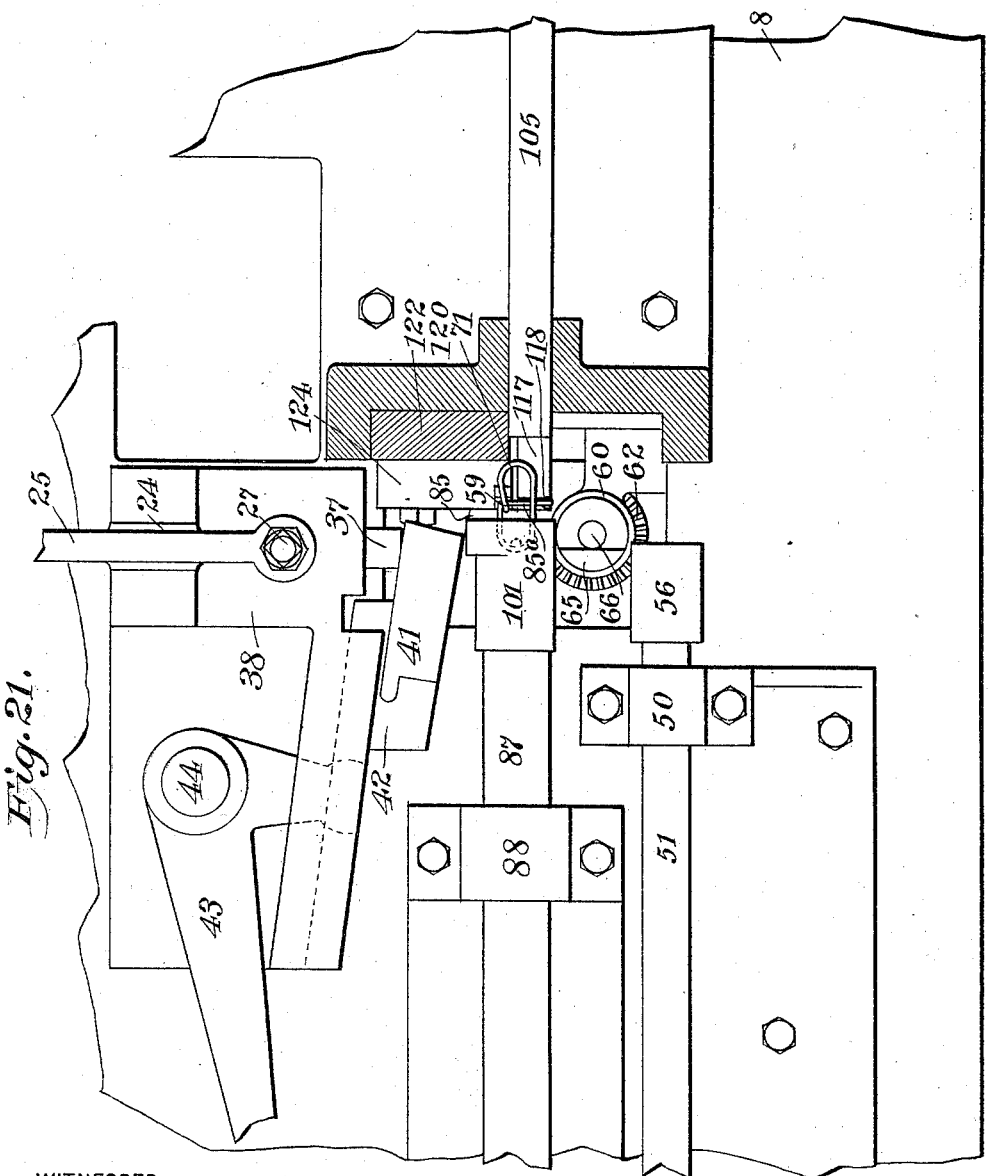

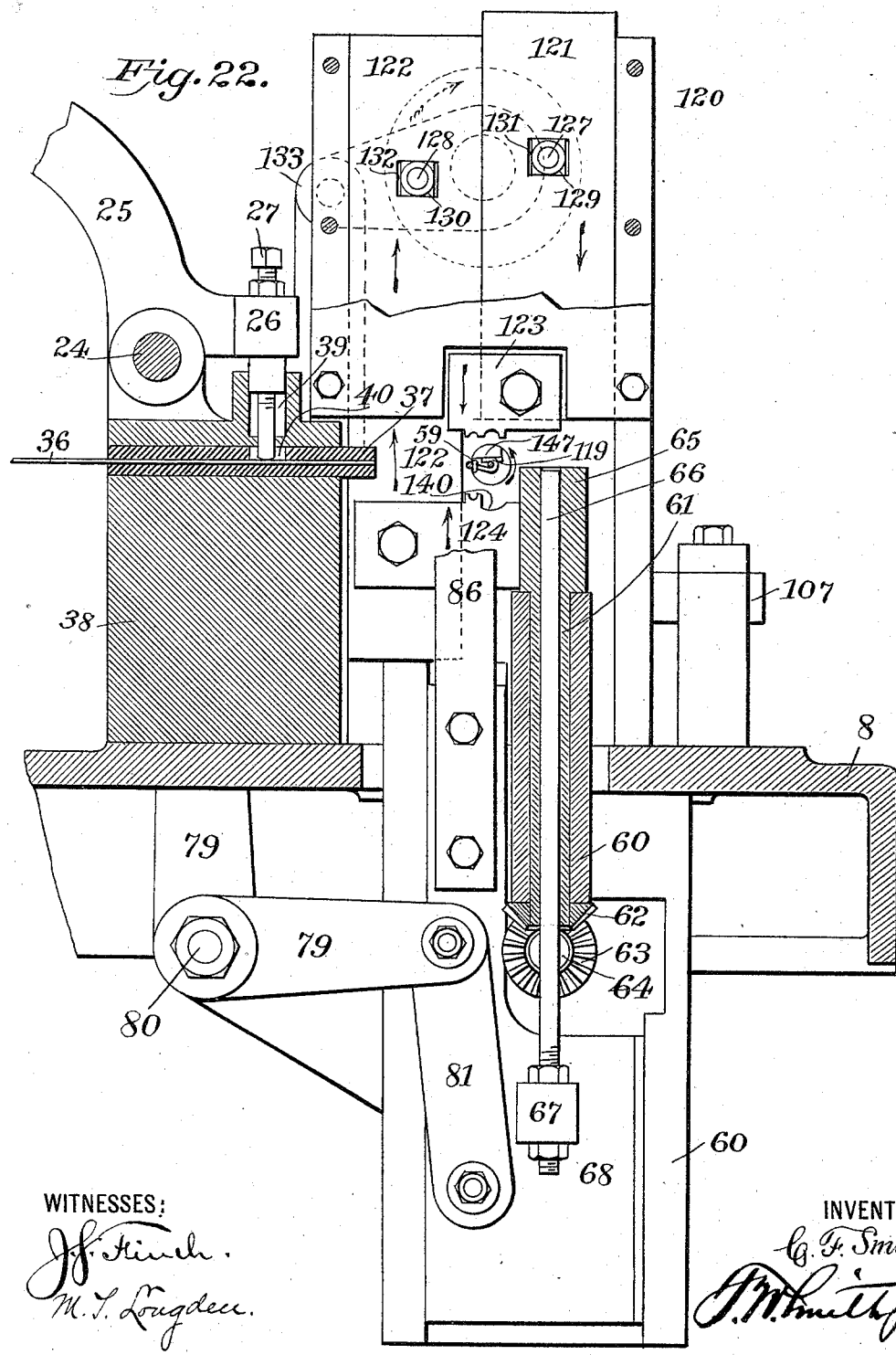

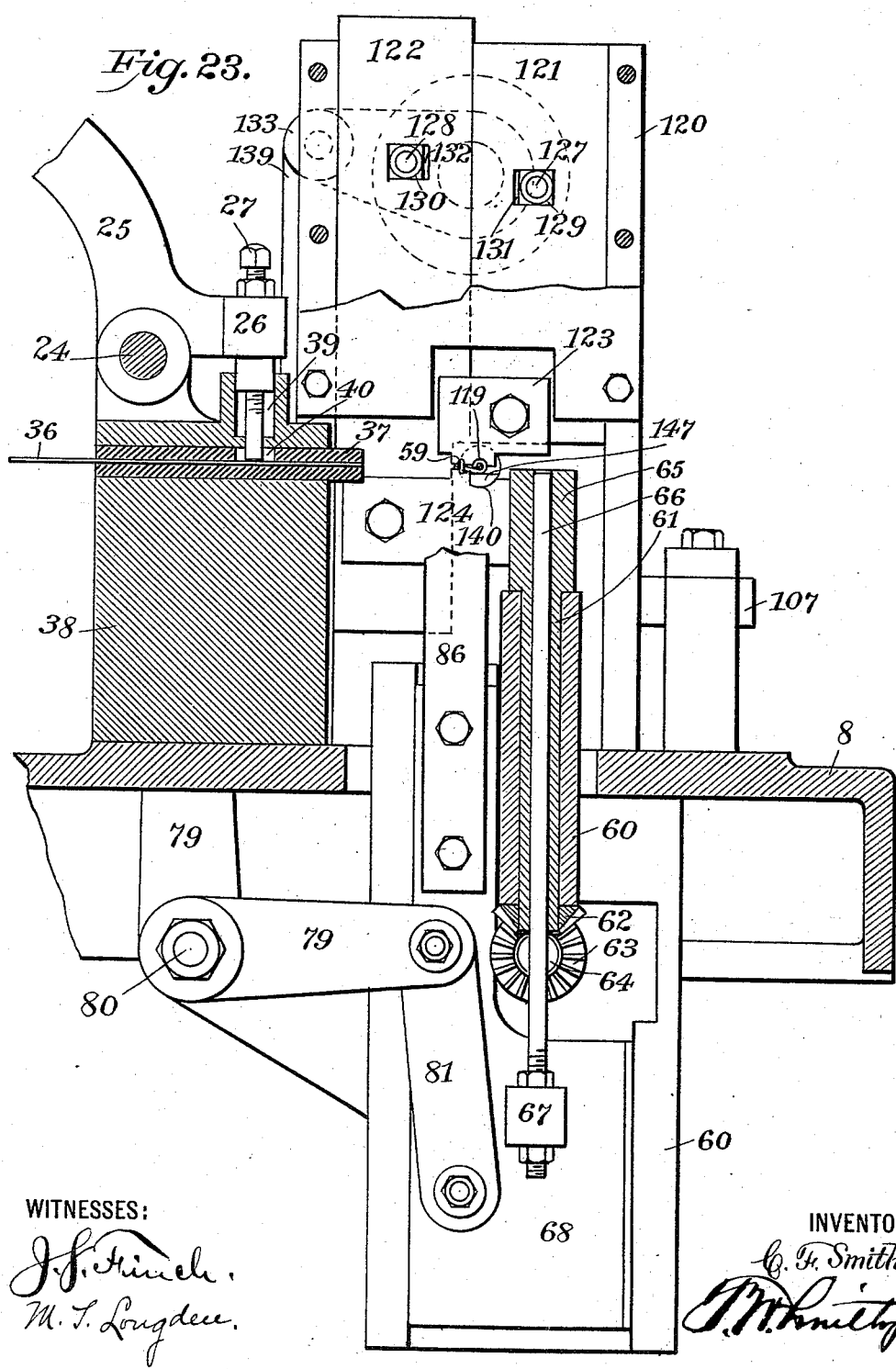

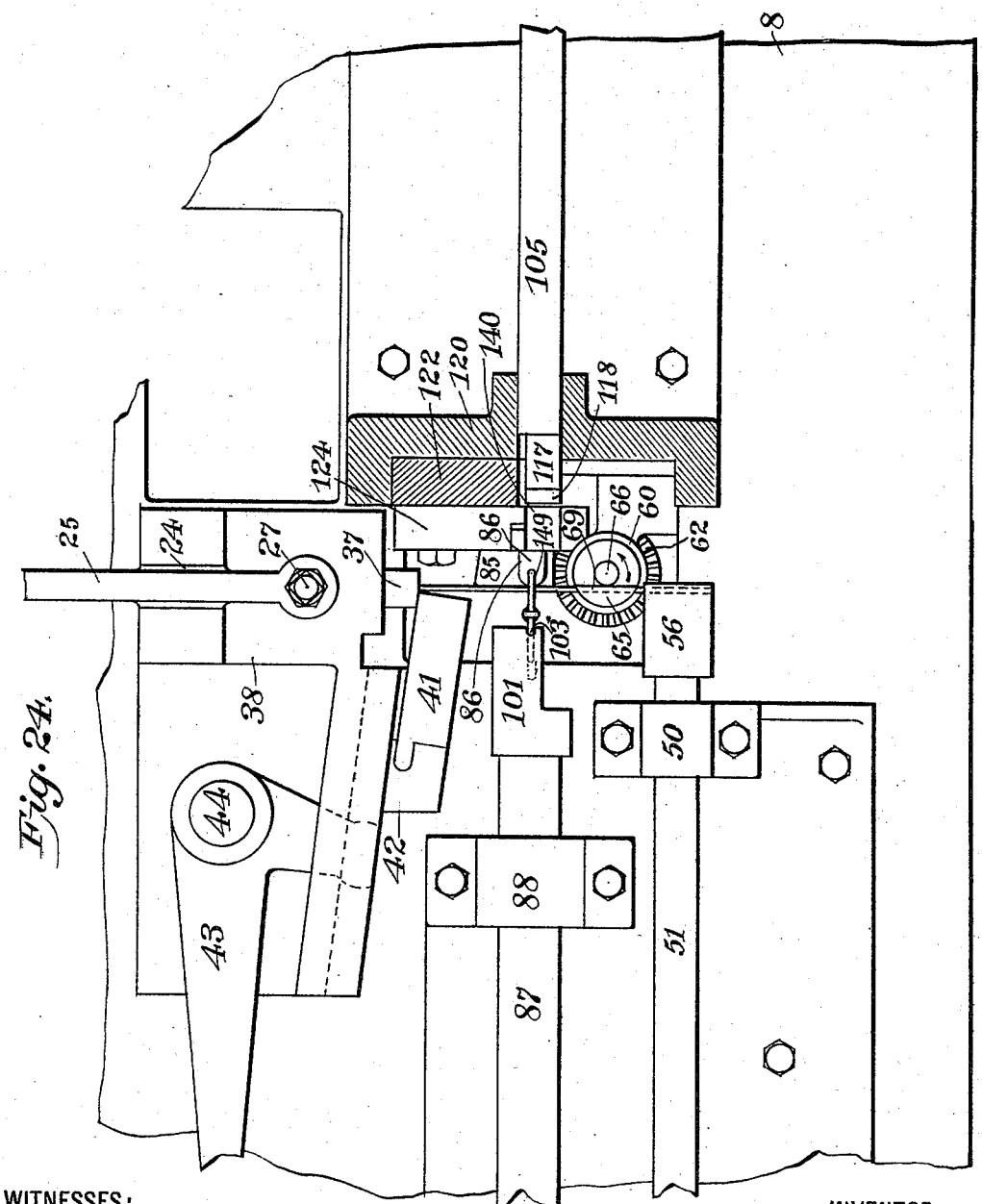

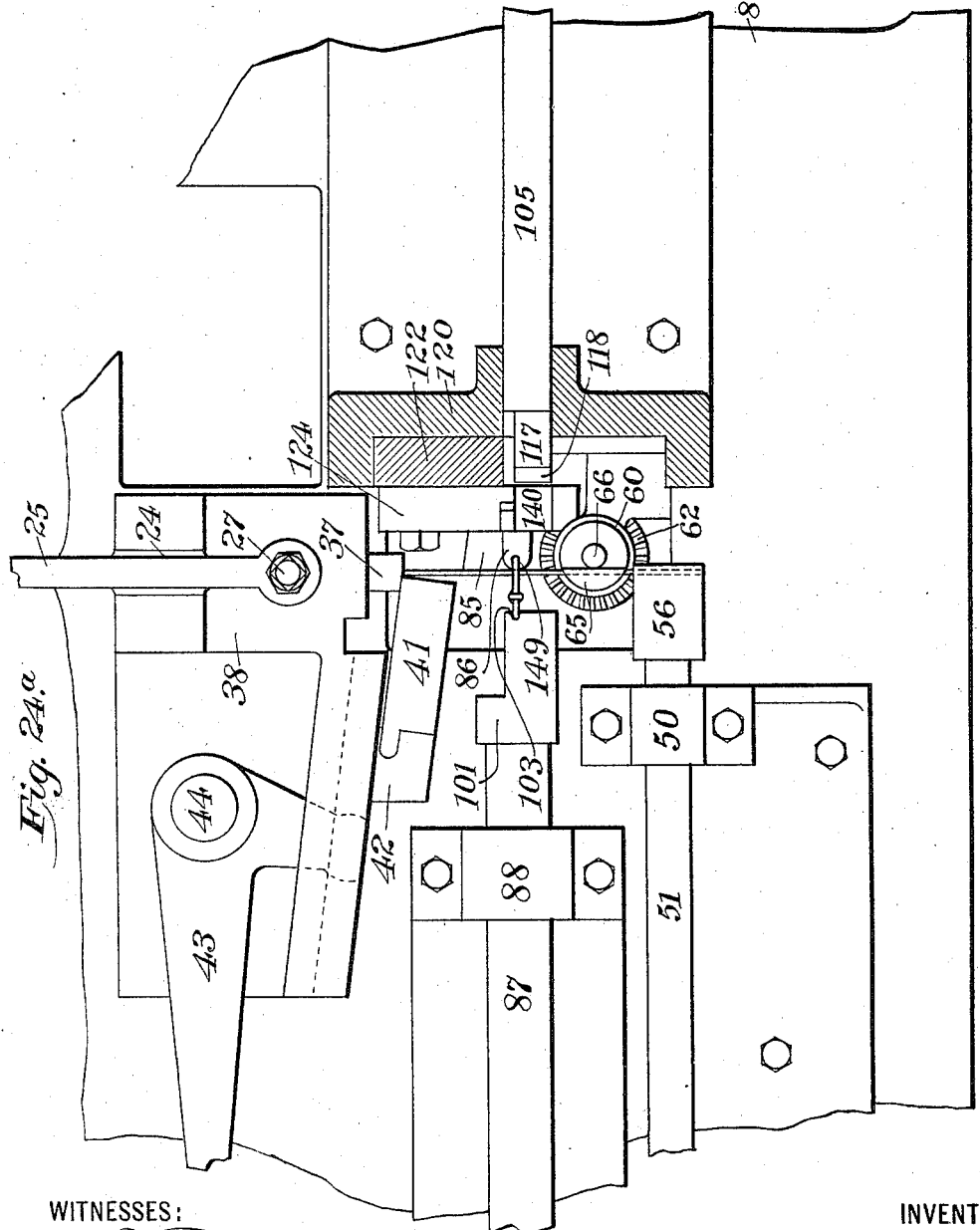

(No Model.) 18 Sheets—Sheet 18.
C. F. SMITH.
MACHINE FOR AUTOMATICALLY MAKING WIRE CHAIN.
No. 537,863. Patented Apr. 23, 1895.
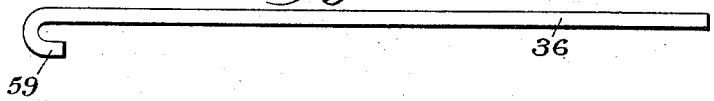
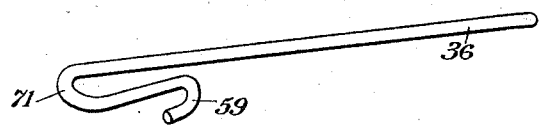
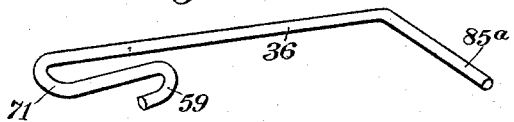
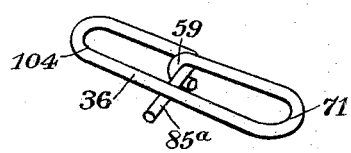
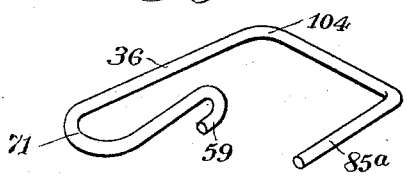
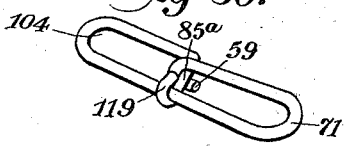
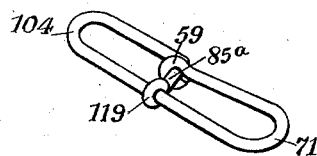
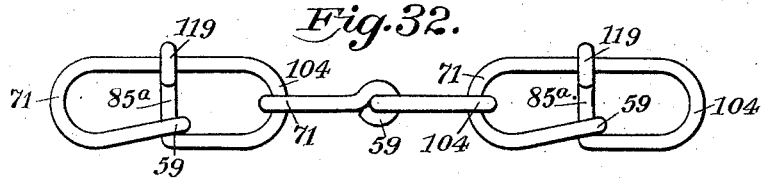
WITNESSES:
J. F. Finch
M. T. Longden
INVENTOR
C. F. Smith.
BY
[signature]
ATTORNEY

UNITED STATES PATENT OFFICE.

CHARLES F. SMITH, OF BRIDGEPORT, CONNECTICUT, ASSIGNOR TO THE SMITH & EGGE MANUFACTURING COMPANY, OF SAME PLACE.

MACHINE FOR AUTOMATICALLY MAKING WIRE CHAIN.

SPECIFICATION forming part of Letters Patent No. 537,863, dated April 23, 1895.

Application filed January 12, 1895. Serial No. 534,723. (No model.)

*To all whom it may concern:*

Be it known that I, CHARLES F. SMITH, a citizen of the United States, residing at Bridgeport, in the county of Fairfield and State of Connecticut, have invented certain new and useful Improvements in Machines for Automatically Making Wire Chain; and I do hereby declare the following to be a full, clear, and exact description of the invention, such as will enable others skilled in the art to which it appertains to make and use the same.

My invention relates to machines for automatically manufacturing chain from wire, but more particularly has reference to the manufacture of a chain composed of links of the same shape and size, each link having two loops one at each end, the extremities of the wire being secured at or about the central portion of the link.

Figure 3:
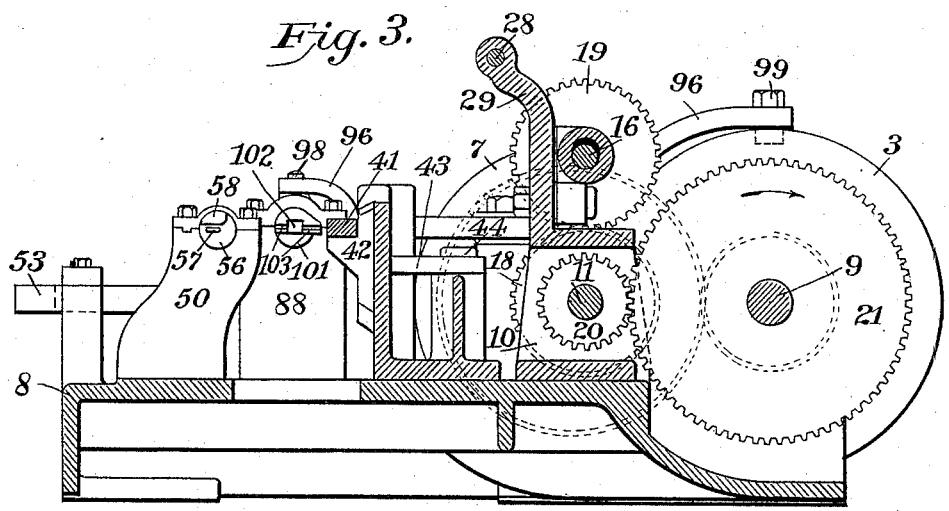
Figure 4:
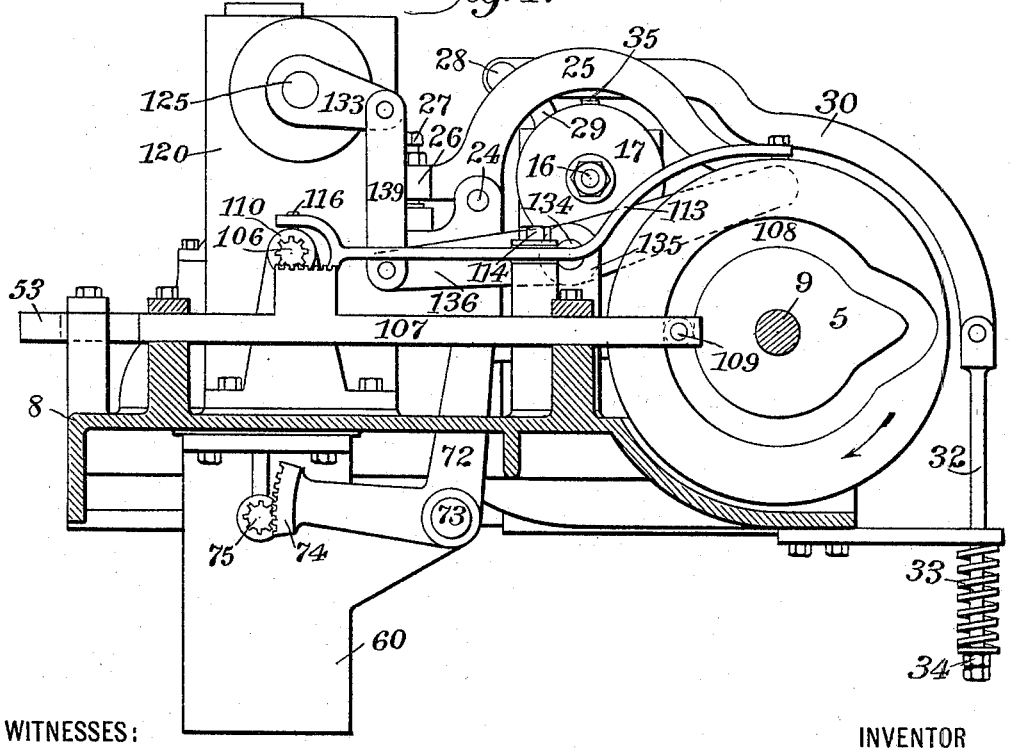
Figure 5:
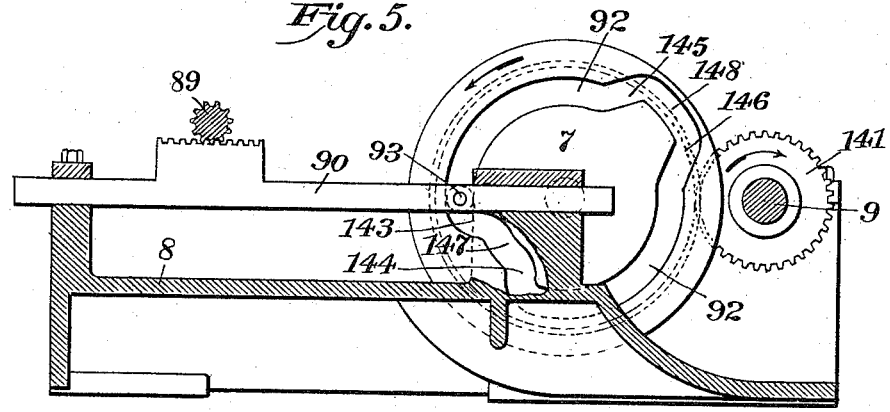
Figure 6:
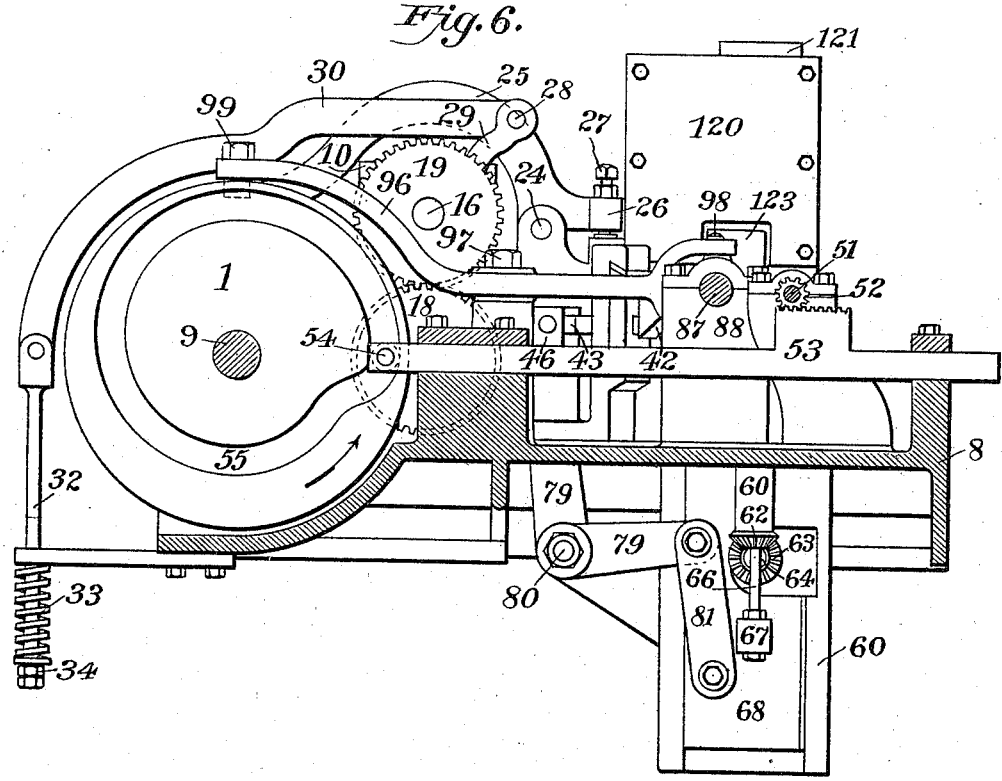
Figure 9:
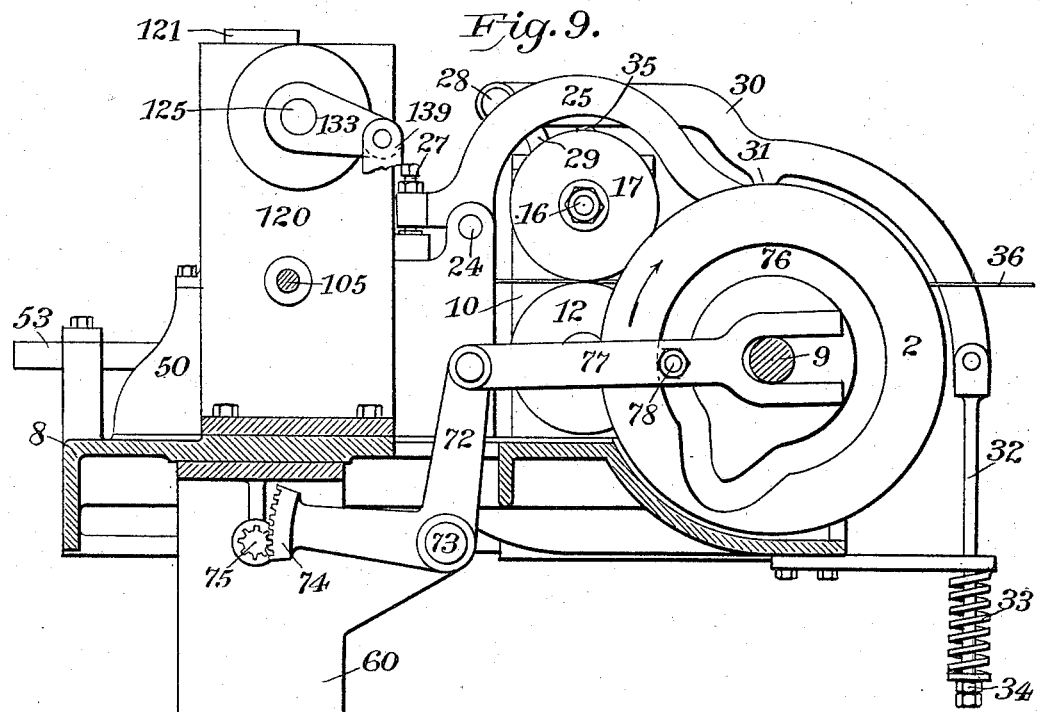
Figure 10:
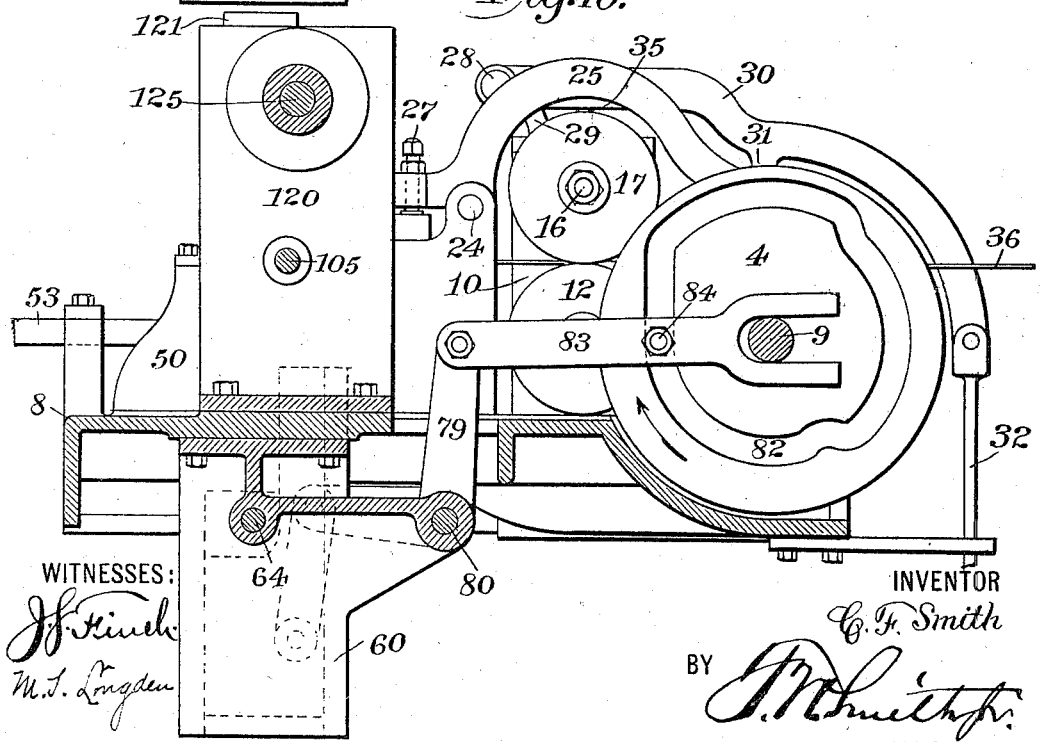
Figure 12:
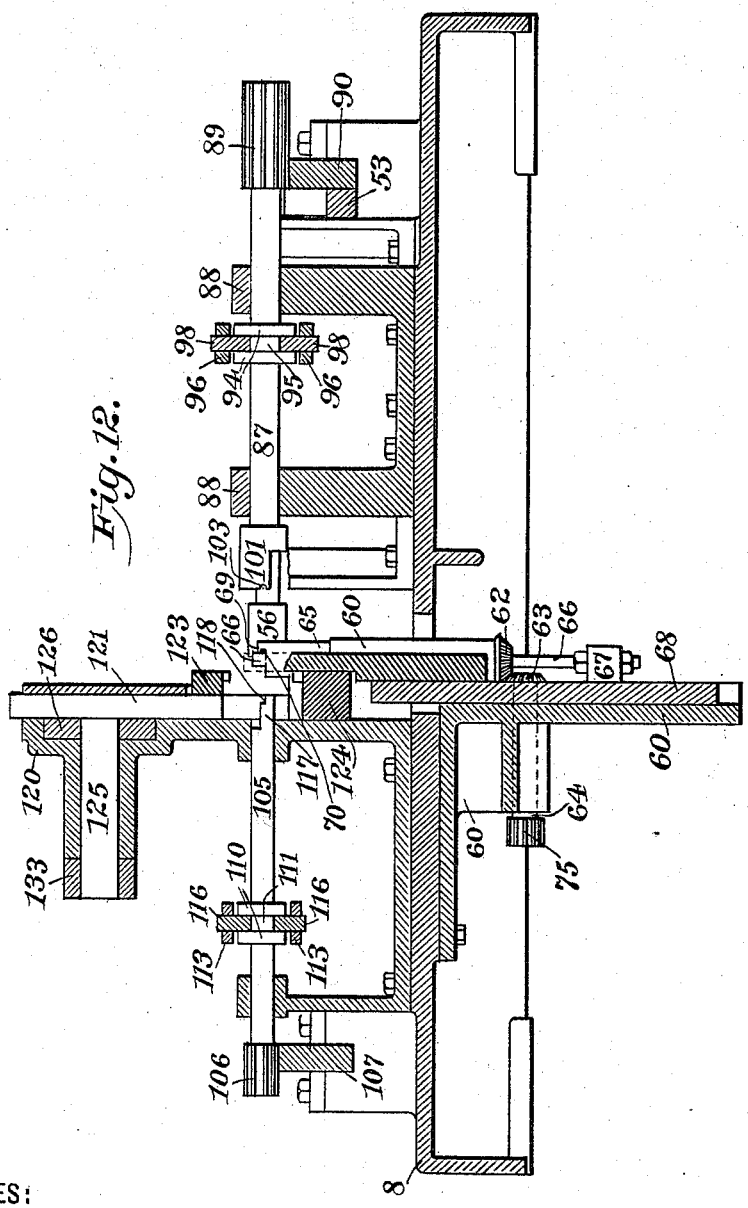

In the accompanying drawings, which form a part of this specification, Figure 1 is a plan of my machine; Fig. 2, a section at the line $a-a$ of Fig. 1, looking in the direction of the arrow $c$; Fig. 3, a section at the line $a-a$ of Fig, 1, looking in the direction of the arrow $b$; Fig. 4, a section at the line $j-j$ of Fig. 1, looking in the direction of the arrow $k$; Fig. 5, a section at the line $d-d$ of Fig. 1, looking in the direction of the arrow $e$; Fig. 6, a section at the line $d-d$ of Fig. 1, looking in the direction of the arrow $f$; Fig. 7, a section at the line $g-g$ of Fig. 1, looking in the direction of the arrow $h$; Fig. 8, a section at the line Q—Q of Fig. 1, looking in the direction of the arrow $r$; Fig. 9, a section at the line $l-l$ of Fig. 1, looking in the direction of the arrow $m$; Fig. 10, a section at the line $n-n$ of Fig. 1, looking in the direction of the arrow $p$; Fig. 11, a section at the line $u-u$ of Fig. 1, looking in the direction of the arrow $v$; Fig. 12, a section at the line $u-u$ of Fig. 1, looking in the direction of the arrow $w$; Fig. 13, a section at the line $s-s$ of Fig. 1, looking in the direction of the arrow $t$; Fig. 14, a detail broken perspective of the tool for performing the second bending operation; Fig. 15, a detail broken perspective of the tool for performing the last bending operation; Fig. 16, a detail perspective of the tool for performing the first bending operation; Fig. 17, a detail perspective of the tool for performing the fourth bending operation. Fig. 18 is a broken detail sectional elevation, on an enlarged scale, taken on the line $s-s$ of Fig. 1, and showing particularly the position of the parts after the first bending operation has been performed; Fig. 19, a detail broken plan, partly in section, and on an enlarged scale, showing the position of the parts after the second bending operation has been performed. Fig. 20 is a view similar to Fig. 19, but showing the position of the parts after the third bending operation has been performed. Fig. 21 is a view similar to Fig. 19, but showing the position of the parts after the fourth bending operation has been performed; Fig. 22, a broken detail sectional elevation, at the line $s-s$ of Fig. 1 looking in the direction of the arrow $a'$, and on an enlarged scale, and showing the position of the parts after the fifth bending operation has been performed; Fig. 23, a view similar to Fig. 22 but showing the position of the parts after the sixth bending operation has been performed. Figs. 24 and 24$^a$ are similar to Fig. 19, and showing the position of the parts when the wire has been fed through the loop of a previously completed link. Figs. 25, 26, 27, 28, 29, 30, and 31 are detail views showing respectively the shape of the wire blank after the performance of the first, second, third, fourth, fifth, and sixth bending operations; and Fig. 32 is a detail elevation showing a short length of the completed chain.

Similar numbers of reference denote like parts in the several figures of the drawings.

8 is the bed of the machine on the rear of which is journaled the main shaft 9 in the usual manner, which shaft carries the various cams for performing the bending operations, as will be hereinafter fully set forth.

For the sake of clearness and a better understanding of my invention, I will first describe the feeding and cutting off mechanisms and afterward the instrumentalities for performing the various bending operations in their proper order.

The mechanism for feeding the wire is shown in Figs. 2, 3, 9, 10, 13, 18, and 22, but particular attention is called to Figs. 2, 3, and 13, from which a clear understanding of such mechanism may be obtained.

Secured to the bed is an upright 10 within the lower portion whereof is journaled the short shaft 11 which carries the lower feed roll 12, and within the upper portion of this upright is a gate 13 within which is a box 14, which latter has a free vertical play and rests upon a coil spring 15 supported by any suitable portion of the upright. Within this box 14 is journaled the short shaft 16 carrying the upper feed roll 17. It will thus be readily understood that the upper feed roll is normally elevated so as not to co-operate with the lower feed roll.

Carried by the shafts 11, 16, are intermeshing gear wheels 18, 19, and also carried by the shaft 11 is a pinion 20 which is engaged by a spur gear 21 on the shaft 9 whereby rotary motion is imparted from the latter to the shaft 11 and thence to the shaft 16, thereby causing the feed rollers to revolve in opposite directions.

Carried by the shaft 9 is a circular disk 22 having a certain portion of its periphery depressed as shown at 23, and pivoted at 24 to the upright 10 is an arm 25 whose rear end rests upon the periphery of the disk 22, so that it will be readily understood that the revolution of said disk will alternately elevate said arm or permit it to be lowered, according as the latter is traveling upon the raised or sunken surface of the disk. A lug 26 extends from said arm in front of the pivotal point and through this lug projects a screw pin 27, the lower end of which is in close proximity to the floor of the feed way for the wire for the purpose presently explained.

Pivoted at 28 to an extension 29 from the upright 10 is an arm 30 which has a nub 31 which rests on top of the arm 25, said arm 30 having depending from its rear or free end a pin 32 which extends loosely through the bed plate, a coil spring 33 being arranged around said pin and confined between a head 34 on the bottom of the latter and the under side of the bed, whereby said arm is normally forced down against the arm 25.

Within the top of the upright 10 is a pin 35 which extends loosely in vertical position through the upright and rests by gravity upon the box 14, the head of said pin normally projecting above the level of said upright as shown at Fig. 2. The arm 30 is always in contact with said pin, so that it will be clear that when the rear end of the arm 25 is traveling in the sunken portion 23 of the disk 22, the action of the arm 30 will force said pin downward and thereby depress the upper feed roll so that it will co-operate with the lower feed roll. It will therefore be obvious that during the time when the rear end of the arm 25 is traveling in said portion 23, the feeding of the wire will occur, and that when said arm is in contact with the remaining portion of the disk 22, the upper feed roll will be elevated.

The wire 36 is run between the rolls and passes through a quill 37 which latter is of course provided with an opening of the proper gage to accommodate the wire, and said quill is supported within the block 38 secured to the bed. This block and quill are provided with vertical openings 39, 40, through which openings the pin 27 passes so as to directly overhang the wire. After the wire has been fed the elevation of the rear end of the arm 25 will cause the pin 27 to bind firmly against the wire as shown at Fig. 22 thereby holding the latter as against any slipping or back thrust up to the time when the cutting off of the blank has occurred. The instrumentalities for cutting off the blank also, by their continued movement, perform the third bending operation, but I will, at the present time, merely describe such instrumentalities only in so far as they operate to cut off the wire.

41 is the cut off tool secured to a slide 42, which latter is capable of a free movement within suitable ways, shown in dotted lines at Fig. 1.

43 is a bell crank pivoted at 44 to the bed of the machine, the front leg of which crank extends loosely within the slide 42, so that when the crank is rocked said slide and the tool 41 carried thereby will be thrown forward and backward. This cut off tool operates across the front of the quill 37 (see Figs. 19 and 20) to shear off the wire blank. 45 is a slide which is guided within a box 46 rigid on the bed, and extending laterally from the rear end of this slide is a roller 47 which lies within a side groove 48 in the cam 3 which latter is mounted on the shaft 9. Carried by the forward extremity of this slide is a swiveled post 49, and through this post the rear leg of the crank 43 extends loosely.

The revolution of the cam 3 will operate the slide to rock the crank forward and backward and thereby cause the tool 41 to be thrown across the front of the quill 37 and retracted therefrom.

I will now describe the mechanism which I employ for performing the first bending operation, reference being had to Figs. 1, 3, 6, 13, 16, 18, and 25.

Journaled in suitable boxes 50 secured to the bed is a shaft 51 having upon its outer extremity a pinion 52 which latter engages with a rack bar 53 capable of sliding freely within suitable ways in the bed. This rack bar carries at its rear end upon one side a roller 54 (see Fig. 6) which projects within a side groove 55 in the cam 1 which latter is mounted on the main shaft 9. As the cam revolves a forward and backward reciprocation will be imparted to the rack bar, whereby the shaft 51 will be rocked first in one direction and then in the other. Secured upon the inner end of the shaft 51 is a head 56, and projecting from the face of this head is the bending stud 57 and the shoulder 58 which are separated from each other by a space just sufficient to admit of the passage of the wire 36. The normal position of this head is shown at Fig. 3, and at Fig. 13 such position is preserved with the wire having been fed so that the extremity thereof extends between said stud and shoulder, preparatory to the revolution of the head to perform the initial bending operation. At Fig. 18 the head is shown as having been revolved throughout an arc of one hundred and eighty degrees, whereby a short bend or hook is formed in the extremity of the wire. The wire having been delivered by the feeding mechanism so that the extremity lies between the bending stud and the shoulder, the timing of the cam 1 is such that the rack bar 53 will be retracted which causes the head 56 to revolve, thereby bending the extremity of the wire snugly around the stud 57, so that there is formed on such extremity a short bend or hook 59, as clearly shown at Fig. 25. In performing the second bending operation, the forward portion of the wire in which the hook has been formed is bent by a suitably shaped and operated tool, so that a loop is formed in a horizontal plane with the hook 59 depending below the same, as shown at Fig. 26, and in describing the manner in which such operation is performed I would call especial attention to Figs. 1, 4, 6, 7, 9, 10, 12, 14, 19, 22, 24, and 26.

60 is a bracket bolted to the bed of the machine on the under side and 61 is a vertical shaft journaled within said bracket. This shaft is hollow and has fixed to its lower extremity a bevel gear 62 which meshes with a bevel gear 63 on the end of a short shaft 64 journaled also in said bracket. The upper end of the shaft 61 carries a head 65 which sets against the bracket so that said shaft is confined as against lengthwise movement by the gear 62 and said head.

66 is a spindle which projects upwardly and loosely through the shaft 61 and is secured at its lower extremity to a lug 67 which projects from a gate 68, which latter is capable of a vertical sliding movement within suitable ways in the bracket 60. The spindle 66 is normally projected above the head 65 (see Fig. 12) and is held in this position to serve as a mandrel around which the second bend in the wire is made, and projecting from the upper face of the head 65 and eccentric thereof is a shoulder 69. This shoulder is undercut as seen at 70 in Figs. 12 and 14 so as to provide a passage way for the wire whereby the latter may be confined laterally between said shoulder and spindle when it is fed to the first bending tool, as shown at Fig. 24. In other words, the feed way 70 is in direct alignment with the space between the stud 57 and shoulder 58 of the first bending tool, so that when the wire is first fed it will be delivered simultaneously to the first and second bending devices.

When the head 65 is revolved in the direction of the arrow (see Fig. 24) the wire will be carried away from the first bending tool and will be bent around the spindle 66 into the form of a loop 71. (See Figs. 19 and 26.)

72 is a bell crank pivoted at 73 to the bed on the under side and having its outer end formed into a segmental gear 74 which meshes with the pinion 75 on the end of the short shaft 64.

2 is a cam carried by the main shaft 9 and having in its side a groove 76, and 77 is a lever having its free end forked and extending around the shaft 9 and having its other end pivoted to the upper leg of the bell crank 72, and provided with a roller 78 which extends laterally within the groove 76. The outline of this groove is such that when the cam is revolved, to and fro rotary movements will be imparted to the short shaft 64 whereby the bending head 65 will be caused to revolve first in one direction and then in the other throughout an arc of about one hundred and eighty degrees as hereinbefore set forth. The initial rotation of the head 65 throughout this arc will of course double the wire upon itself around the upwardly projecting mandrel to form the loop 71, while the return rotation of said head will restore the same to normal position and remove the shoulder 69 out of the way of the devices for subsequently bending the wire. Simultaneously with the return movement of the head 65 the spindle 66 is lowered. As hereinbefore stated this spindle is secured at its lower end to the gate 68, which latter is caused to have a vertically sliding movement in a manner which I will now describe.

79 is a bell crank pivoted at 80 to the bed of the machine, and 81 is a link whose extremities are pivoted respectively to said gate and to the lower leg of said bell crank. (See Fig. 22.)

4 is a cam mounted on the main shaft 9 and having in its side face a groove 82, and 83 is a lever whose rear extremity is forked and is supported around said shaft, the other end of this lever being pivoted to the upper leg of the bell crank 79, while carried by this lever is a roll 84 (see Fig. 10) which extends within said groove. As the cam 4 revolves it will be obvious that vertical reciprocatory movements will be imparted to the gate 68. This gate carries parts other than the spindle, as will be presently set forth, and the groove 82 is so cut as to impart a predetermined variable reciprocation to this gate, but in the present instance it is necessary only to state that the revolution of the cam 4 will cause the spindle to be elevated during the performance of the second bending operation, and to be lowered as soon as such operation is completed. Immediately after the completion of this second bending operation the cut off tool 41 operates to sever the wire blank in the manner hereinbefore set forth, but this tool, continuing its travel, assists in the performance of the third bending operation, namely, the formation of a rectangular bend at the inner or severed end of the blank, which operation I will now explain.

85 is a mandrel which is carried by the gate 68 and is projected upwardly, during the third bending operation, above the line of feed of the wire. This mandrel, when in elevated position, is immediately in front of the wire blank, and the rear edge of the mandrel is substantially in alignment with the forward edge of the cut off tool 41, so that when the latter is projected it will cut off the wire and bend the latter around the corner of the mandrel at substantially a right angle, as shown at 85ª Figs. 20 and 27. This last operation leaves the blank in the shape shown at Fig. 27, preparatory to the formation of the loop at the severed end of the blank and the bringing of the extremities together so as to be in position for the final setting down of the latter.

The means which I employ for performing the fourth bending operation are a mandrel 86 and a reciprocatory bending tool for forming a generally U-shaped loop around such mandrel.

In describing the fourth bending operation attention is called to Figs. 1, 2, 5, 10, 12, 17, 19, 20, 21, 24, 28, and 29.

87 is a shaft journaled in boxes 88 supported on the bed, and carrying on its rear end an elongated pinion 89 which latter meshes with a rack bar 90 capable of lengthwise movements within suitable ways on the bed.

7 is a cam carried by a short shaft 91, journaled in any suitable boxes supported on the bed, said cam having in its side face a groove 92 into which projects a roller 93 (see Fig. 5) carried laterally by the rack bar 90. When the cam 7 is revolved, the rack bar 90 will be projected and retracted to impart reverse rotary movements to the shaft 87.

94 is a collar secured around the shaft 87 and having in its periphery an annular groove 95.

96 is a lever pivoted at 97 to the bed, and having a stud 98 at its forward end which depends within the groove 95, while the rear end of said lever carries a roll 99 which depends within a groove 100 cut in the periphery of the cam 3. As the cam 3 is revolved, the lever 96 will be thrown forward and backward carrying with it the shaft 87. Secured on the inner end of this shaft 87 is a head 101 (shown in detail at Fig. 17) which is recessed in its face as seen at 102 to form the loop around the mandrel 86 and to contain said loop when formed, as will be presently more fully explained. Extending across the face of the head 101 from side to side is a groove 103 adapted to fit snugly over the wire, which groove also extends within the walls of the recess 102.

Immediately prior to the third bending operation, the cam 3 operates to throw the head 101 against the wire blank, whereby the groove 103 will fit snugly around the wire blank so as to hold the latter as against displacement during the performance of both the third and fourth bending operations, as shown in dotted lines at Fig. 20. Of course this head 101 performs no active part in the third bending, and its function in this connection is precautionary rather than necessary, and although the projection of said head may be deferred until after the third bending, I prefer to operate it in the manner above described. The mandrel 86 is in a higher plane than the mandrel 85 and immediately preceding the further projection of the head 101, the cam 4 operates to lower the gate 68 to an extent sufficient to bring the mandrel 85 below the horizontal plane of the wire blank, but at the same time leaving the mandrel 86 immediately in front of said blank. The cam 3 now operates to throw the head 101 still farther forward, whereby the blank is bent around the mandrel 86, said head inclosing the mandrel and the loop thus formed, as shown at Figs. 21 and 29. During this bending of the blank the rectangular bent portion 85ª will pass within the hook 59 and will extend beneath and project beyond the opposite side wire of the partially formed link, as clearly shown at Fig. 29, and while this operation is being performed the revolution of the cam 7 will impart no movement to the rack bar 90, and therefore at this time the head 101 will not revolve.

I will now explain the parts which operate to perform the fifth bending operation, and in this connection will call attention to Figs. 1, 4, 11, 12, 15, 21, 22, 23, and 30.

105 is a shaft journaled in suitable boxes supported on the bed and carrying on its rear end an elongated pinion 106, which latter meshes with a rack bar 107 guided within suitable ways on the bed.

5 is a cam carried by the main shaft 9 and having in its side face a groove 108 (see Fig. 4) within which a roll 109 extends laterally from the rack bar 107. As the cam is revolved the rack bar will be moved forward and backward, thus imparting to the shaft 105 reverse rotary movements. Secured around this shaft 105 is a collar 110 having in its periphery an annular groove 111.

6 is a cam carried by the main shaft 9 and having in its periphery a groove 112, and 113 is a lever pivoted at 114 to the bed, the rear end of said lever carrying a roll 115 which depends within the groove 112, while the forward end of said lever carries a stud 116 which depends within the groove 111. As the cam 6 revolves the lever 113 will be swung forward and backward to project and retract the shaft 105 for the purpose presently explained. Carried by the inner end of this shaft 105 is a ledge 117 (shown in detail at Fig. 15) which projects eccentrically from said shaft and is provided with a notch 118 near its outer end. Immediately after the completion of the fourth bending operation, the cam 6 operates to project this ledge immediately beneath the partially formed link, said ledge extending laterally beyond the straight side of the link so that the extremity of the wire which projects beyond said side will be within the notch 118, as clearly shown at Fig. 21. The cam 5 now operates to revolve the shaft 105, whereby the ledge 117 will be carried around so as to curl this projecting end of the wire around the adjacent side wire of the link to form a hook 119, as clearly shown at Figs. 22 and 30. During the operation of this tool 117 to perform the fifth bending operation the gate 68 and the head 101 will both remain stationary, or, in other words, in the position shown at Figs. 21 and 22, and immediately after the ledge 117 has performed its function, as above set forth, the cam 5 will operate to revolve the shaft 105 in the reverse direction thereby restoring said ledge to its position beneath the link, as shown at Fig. 23, and this position of the ledge is maintained during the final operation of closing the hooks 59 and 119. This operation for finally shaping the link is performed by means of dies which are carried by gates that slide in reverse directions, and, in describing this operation I will refer particularly to Figs. 1, 4, 8, 9, 11, 12, 22, 23, and 31.

120 is an upright bolted to the bed of the machine, and 121, 122, are gates capable of independent sliding movements within suitable ways in said upright (see Figs. 22 and 23) and to the gate 121 is bolted the upper die 123, while to the gate 122 is bolted the lower die 124.

125 is a horizontal rock shaft journaled within the upright 120 and having secured to its inner end a disk 126 free to revolve within suitable peripheral bearings in said upright. Extending from the face of this disk at points diametrically opposite to each other in substantially a horizontal plane are crank pins 127, 128, which project loosely within blocks 129, 130, which latter are contained and have a horizontal play within openings 131, 132 through said gates. It will be obvious that the rocking of this disk 126 in reverse directions will cause reverse vertical reciprocation of said gates whereby the dies 123, 124, will be brought together and separated.

Secured to the outer end of the rock shaft 125 is a crank 133 (see Figs. 1, 4, 8, and 11), and pivoted at 134 to a support 135 rising from the bed is a lever 136. The rear end of said lever carries a roll 137 which extends laterally within a groove 138 cut in the side of the cam 6, while a link 139 is pivoted at its extremities respectively to the crank 133 and the forward end of said lever. (See Fig. 8.) As the cam 6 revolves the lever 136 will be vertically rocked, thereby imparting a rocking movement to the disk 126, for the purpose hereinbefore set forth.

When the gates 121, 122, are operated as before set forth, the dies 123, 124, will be closed above and below against the hooked extremities 59 and 119, thereby setting them down firmly into the form of eyes, whereby the link is completed, as clearly shown at Fig. 23. The lower die 124 is cut away as seen at 140 so as to conform closely to the ledge 117 and to reinforce the latter in its position beneath the link during this sixth bending operation. There is no especial object in keeping this ledge beneath the link at this time, except that the machine may be run at a higher speed to greater advantage, it being unnecessary to consume any time in withdrawing the ledge.

Immediately after the completion of the sixth bending operation the cam 6 operates to withdraw the dies from the link, and it now becomes necessary to feed the wire for a new link within one of the loops of the previously completed link.

During the performance of the fifth and sixth bending operations the head 101 will remain in the position shown at Fig. 21, where one loop of the link is shown as contained within the recess 102 in this head, the completed link lying in a horizontal plane.

In order to feed the wire through the loop of a previously formed link, it becomes necessary to give such link a quarter turn so that it will stand in a vertical plane, and also to retract the link so that the loop 71 will be opposite to the feed way of the wire. This is accomplished by the rotatory and lengthwise movements of the shaft 87, such movements being effected and controlled by the cams 3 and 7, in the manner which I will now describe.

After the completion of the sixth bending operation the cam 6 operates to separate the dies, and at the same time to retract the ledge 117 to normal position, and prior to any movement whatever of the head 101 the cam 4 operates to lower the gate 68 thereby withdrawing the mandrel 86 from the loop in said head. The cam 7 now operates to give the head 101 a quarter turn and at the same time the cam 3 operates to retract such head until the free or projecting loop is opposite to the feed way of the wire, (as clearly shown at Fig. 24) whereupon the wire is now fed through this loop in the manner hereinbefore set forth, the head remaining stationary during this feeding. As soon as the feeding of the wire is completed, the cam 3 operates to retract the head 101 whereby the finished link is stripped or withdrawn from said head and allowed to drop by gravity into any suitable well or receptacle 150 for the finished chain. A notch 149 is cut in the mandrel 86 to accommodate the wire of a previously formed link so that the operation of the head 101 to form a loop around said mandrel for a succeeding link is unimpeded. After the finished link has been withdrawn from the head the retraction of the latter continues until it has reached its normal position, while at the same time the cam 7 operates to give said head a quarter turn back to its original position first referred to and shown at Figs. 1 and 19. The various instrumentalities are now in position for making a succeeding link, and their operations are the same as hereinbefore set forth, with the exception that the head 101, during its initial retraction to bring the subsequently finished link into proper position opposite the feed way of the wire, is given a quarter turn by the operation of the cam 7 in a direction reverse to that shown at Fig. 24, or, in other words, this turning of the head brings the latter in the position shown at Fig. 24ᵃ. The object of this turning of succeeding links in opposite directions is to bring corresponding bends on alternate links into the same position with respect to each other.

In chain of this sort adjacent links are at right angles to each other, so that alternate links only are in the same plane and it is very desirable that alternate links should correspond with each other and be uniform in every respect, and it will be quite obvious that if the head 101 turned all the links in the same direction for the purposes of threading succeeding blanks, only every fifth link would correspond and be uniform. This reverse turning of the links is therefore a very important feature, and I will still further describe in detail the construction of the cam 7 and its operations for effecting such turning, reference being had particularly to Figs. 1, 5, 12, 19, 21 and 24.

Calling attention in the first place to Figs. 1 and 5, 141 is a pinion on the main shaft 9 meshing with a spur gear 142 carried by the short shaft 91 and moving in harmony with the cam 7. The relative size of this pinion and gear is such that a complete revolution of the pinion will impart only one half a revolution to the spur gear, and therefore it will be clear that the cam 7 only accomplishes a half revolution during the formation and completion of a link. The contour of the groove 92 in this cam 7 of course determines the variable throw of the rack bar 90, and consequently the variable movements of the head 101. This groove extends inwardly, as shown at 143, 144, at one side of the cam, and at the diametrically opposite side of the cam said groove leads outwardly as seen at 145, 146. Dwells in the groove are made at these diametrically opposite points between the portions 143, 144 and 145, 146, these dwells being denoted by 147 and 148 respectively. The rest of the groove 92 on both sides between the points 143, 145, and 144, 146, is concentric with the shaft 91 and therefore constitutes dwells. While the roll 93 is in the position as shown at Fig. 5 within one of the long dwells in the groove immediately beyond the portion 143, the various parts of the machine are in their normal position preparatory to forming a link, and while the roll travels throughout this dwell until it reaches the point 145, all the various bending operations hereinbefore described are performed, and immediately before the roll travels throughout the portion 145 the parts are in the position shown at Fig. 21. When the roll travels throughout the portion 145 of the groove the rack bar will be projected thereby giving the head 101 a quarter turn to the position shown at Fig. 24, and during this time the cam 3 will have operated to initially withdraw said head. While the roller is traveling throughout the dwell 148 the wire for a subsequent link will be fed through the loop of a previously formed link, and during this time the cam 3 will operate to still further withdraw said head to strip the finished link as hereinbefore set forth. As the roll travels throughout the portion 146 of the groove the rack bar will be retracted thereby giving said head a quarter turn back to its normal position with the groove 103 disposed in a horizontal plane, and simultaneously the cam 3 operates to retract said head to its normal position as shown at Fig. 1. As the roll travels throughout the long dwell in this groove between the points 146 and 144, during the continued revolution of the cam, the various bending operations are performed whereby a succeeding link is completed, and immediately before the roll travels throughout the portion 144 the parts are in the position shown at Fig. 21. When the roll travels throughout the portion 144 of the groove the rack bar will be again retracted thereby giving the head 101 a quarter turn to the position shown at Fig. 24ᵃ, or, in other words, to a position in a reverse direction to that previously set forth and shown at Fig. 24, and during this time the cam 3 will have operated to initially withdraw said head. While the roll is traveling throughout the dwell 147 the wire for a subsequent link will be fed through the loop of a previously formed link, and during this time the cam 3 will operate to still further withdraw said head to strip the finished link as hereinbefore set forth. As the roll travels throughout the portion 143 of the groove the rack bar will be projected thereby giving said head a quarter turn back to its normal position with the groove 103 disposed in a horizontal plane, and simultaneously the cam 3 operates to retract said head to its normal position as shown at Fig. 1. It will thus be obvious that during a complete revolution of the cam 7 two completed links will be formed by the machine, and that the head 101 is revolved first in one direction and then in the other whereby succeeding completed links are turned in opposite directions for the purpose of feeding the wire for subsequent links.

In the description heretofore given of the various feeding, cutting off and bending operations, no particular mention has been made of any peculiar shape of the various cam surfaces or grooves, excepting in the instance of the cam 7, since no description is deemed necessary for the reason that it will be readily understood that the cutting of the cams is such as to produce the necessary movements or dwells of the various parts and mechanisms.

The operation of my improvement, constructed and working as to its parts in the manner hereinbefore set forth, is as follows: Pre-supposing a link to have been completed and to be held within the head 101 and the wire for a subsequent link having been threaded through the free loop of the completed link as shown at Fig. 24, the cam 3 now operates to retract this head so that the finished link will be stripped therefrom, and after such link is freed from the head the cam 7 operates to give said head a quarter turn to bring it into the normal position shown at Fig. 1. The cam 1 meantime has operated to cause the head 56 to turn a half revolution thereby completing the first bending operation, as shown at Fig. 18. The cam 2 next operates to revolve the head 65 around the mandrel 66 which latter has been elevated by the action of the gate 68 controlled by the cam 4, whereby the second bending operation is completed and the parts brought into the position shown at Fig. 19. The action of the cam 3 now causes the cutter bar 41 to sever the wire and continuing to perform the third bending operation, said cam also causing the head 101 to advance to embrace the wire blank to hold the same as against displacement during such operation. The cam 4, during this action of the cam 3 effects a slight lowering of the gate 68 whereby the mandrel 66 is brought below the level of the wire, and in performing the forth bending operation the head 101 is advanced by the continued action of the cam 3, so as to bend the blank around the mandrel 86, as shown at Fig. 21. The cam 6 then operates to project the ledge 117 beneath the link as hereinbefore set forth, while immediately following the cam 5 effects a half revolution of said ledge, whereby the fifth bending operation is performed and the link completed with the exception of setting down the hooked portions, as shown at Fig. 22. Before the next operation this cam 5 causes the ledge 117 to revolve back to normal position immediately below the link, whereupon the dies 123, 124, are closed upon the hook portions by the action of the cam 6, and the link finally completed, as shown at Fig. 23.

It will be obvious that some of the parts herein shown and described may be used without the others, and that my invention in part or parts may be carried out by other parts or mechanisms well known to any ordinary mechanic, and I therefore do not wish to be confined to the exact details of construction shown and described.

Having thus described my invention, what I claim as new, and desire to secure by Letters Patent, is—

1. The combination of the bed, the upright rising therefrom and having a gate 13 in its top, the box within said gate and capable of a free vertical play, the spring whereby said box is normally elevated, the lower and upper feed rolls journaled respectively in said upright and box and carrying on their shafts intermeshing spur gears, means for revolving the lower gear, the circular rotary disk 22 having its periphery sunken at 23, the lever 25 pivoted to the bed of the machine and provided at its outer end with a roller which travels on the periphery of said disk and having at its inner end a projecting lug, a vertical pin depending through said lug to a point immediately above the feed way of the wire whereby when the outer end of the lever is elevated said pin will be forced against the wire to grip the same, the pin 35 extending loosely through the top of said upright and resting upon said box, the lever 30 pivoted to said upright and in normal contact with the top of said pin and lever 25, and the spring whereby said lever is normally depressed, substantially as set forth.

2. In a machine for automatically making wire chain of the character described, the combination of the hollow vertically disposed and rotary head having projecting eccentric thereof a bending shoulder, the vertical mandrel concentric within said head and having a free movement therein and separated from the same by a space sufficient to contain the wire, means for turning said head a half revolution, and means for lowering said mandrel, whereby the second bending operation is performed, substantially as set forth.

3. The combination of the bed, the bracket 60 bolted thereto, the hollow rotatory vertical shaft 61 journaled within said bracket and carrying on its lower end bevel gear 62 and on its upper end hollow head 65, the vertically reciprocatory gate 68 within suitable ways within said bracket, the mandrel 66 carried by said gate and extending upward through said shaft and head and capable of a free movement therein, the shaft 64 journaled in said bracket and carrying bevel gear 63 which meshes with said gear 62, and independent instrumentalities for revolving the shaft 64 and for reciprocating the gate 68, substantially as set forth.

4. In a machine for automatically making wire chain of the character described, the combination of the quill through which the wire is fed, the cut off tool and means for reciprocating the same across the front of said quill whereby the wire is severed, the lower press gate carrying the rectangular mandrel, and means for elevating said gate prior to the operation of the cut off tool, whereby the continued movement of the latter will bend the severed end of the blank into rectangular shape around said mandrel, thereby performing the third bending operation, substantially as set forth.

5. The combination of the quill through which the wire is fed, the lower press gate carrying the mandrel 85, means for elevating and lowering said gate, the slide capable of a free movement within suitable ways on the bed, the cut off tool carried by said slide and capable of reciprocation in front of said quill and between the latter and said mandrel, the reciprocatory slide bar within suitable ways in the bed, the pivoted bell crank having its extremities loosely connected with said slide and slide bar respectively, and means for reciprocating the latter, substantially as set forth.

6. In a machine for automatically making wire chain of the character described, the combination of means for initially forming a hook in one extremity of the wire, for doubling said extremity to form a loop with said hook depending therefrom and for forming a rectangular bend in the other end of the wire, with mechanism for bending around this end last referred to into the form of a loop and for simultaneously causing said rectangular bend to enter said hook beneath the link and to project laterally beyond the opposite side of the latter, substantially as set forth.

7. In a machine for automatically making wire chain of the character described, the combination of mechanisms for initially forming a hook in one extremity of the wire, for bending said hook end into the form of a loop with the hook depending therefrom and for forming a rectangular bend in the opposite end of the wire, with the lower press gate carrying the mandrel 86, means for elevating said gate whereby said mandrel is brought above the horizontal plane of the wire, the shaft capable of a lengthwise reciprocation and carrying at its inner end a recessed head having a horizontally disposed groove opposite said wire, and means for projecting said shaft whereby the wire is bent into the form of a loop around said mandrel and within said recessed head, thereby performing the fourth bending operation, substantially as set forth.

8. In a machine for automatically making wire chain of the character described, the combination of mechanisms for initially forming a hook in one end of the wire, for bending said end into the form of a loop with the hook depending therefrom, for forming a rectangular bend on the opposite end of the wire and for forming a loop in this end last referred to with said rectangular bend extending within said hook and projecting beyond the opposite side wire of the link, with means for bending said projecting end around the opposing side wire of the link, whereby the fifth bending operation is performed, substantially as set forth.

9. In a machine for automatically making wire chain of the character described, the combination of mechanisms for initially forming a hook in one end of the wire, for bending said end into the form of a loop with the hook depending therefrom, for forming a rectangular bend on the opposite end of the wire and for forming a loop in this end last referred to with said rectangular bend extending within said hook and projecting beyond the opposite side wire of the link, with the rotatory shaft 105 capable of a lengthwise reciprocation and carrying on its inner end the notched ledge 117, means for projecting said shaft whereby the notched portion of said ledge is extended immediately beneath said projecting end of the wire, and means for turning said shaft a half revolution whereby said projecting wire is bent around the opposing side wire of the link, substantially as set forth.

10. In a machine for automatically making wire chain of the character described, the combination of mechanisms for initially forming a hook in one end of the wire, for bending said end into the form of a loop with the hook depending therefrom, for forming a rectangular bend in the opposite end of the wire, for forming a loop in this end of the wire with said rectangular bend extending within said hook and projecting beyond the opposite side wire of the link and for bending said projecting end into the form of a hook around the opposing side wire of the link, with means for completely closing said hook ends whereby the sixth bending operation is performed and the link completed, substantially as set forth.

11. In a machine for automatically making wire chain of the character described, the combination of mechanisms for initially forming a hook in one end of the wire, for bending said end into the form of a loop with the hook depending therefrom, for forming a rectangular bend in the opposite end of the wire, for forming a loop in this end last referred to with said rectangular bend extending within said hook and projecting beyond the opposite side wire of the link and for bending said projecting end into the form of a hook around the opposing side wire of the link, with the upright 120 secured to the bed of the machine, the gates guided within said upright and capable of independent vertical reciprocations, upper and lower dies respectively carried by said gates, and means for sliding said gates in reverse directions whereby said dies are closed against said hook ends, substantially as set forth.

12. In a machine for automatically making wire chain of the character described, the combination of mechanisms for initially forming a hook in one end of the wire, for bending said end into the form of a loop with the hook depending therefrom, for forming a rectangular bend in the opposite end of the wire, for forming a loop in this end last referred to with said rectangular bend extending within said hook and projecting beyond the opposite side wire of the link and for bending said projecting end into the form of a hook around the opposing side wire of the link, with the upright 120 secured to the bed of the machine, the gates guided within said upright and capable of independent vertical reciprocations and having openings therein, the blocks within said openings and having lateral play therein, upper and lower dies respectively carried by said gates, the horizontal short shaft journaled within said upright and having fixed to its inner end a disk provided with diametrically opposite crank pins extending from its face loosely within said blocks, the crank secured to the outer end of said shaft, and means for rocking said crank whereby said gates are caused to slide in reverse directions and the dies closed against said hook ends, substantially as set forth.

13. In a machine for automatically making wire chain of the character described, the combination of the shaft capable of both rotatory and lengthwise reciprocations and carrying at its inner end a head recessed and open at the bottom and having within said recess a horizontally disposed groove, means whereby the link is formed and completed with one end housed within said groove in a horizontal plane, means for giving said head a quarter turn whereby the completed link is brought into a vertical plane preparatory to the threading of a succeeding wire blank, means for retracting said head whereby the completed link is withdrawn therefrom, means for revolving said head whereby said groove is restored to its normal horizontal position preparatory to receiving a succeeding link, means for advancing said head whereby a succeeding link is housed therein, and means for giving said head a quarter turn in a direction reverse to the previous turning whereby said succeeding link is brought into a vertical plane, substantially as set forth.

14. In a machine for automatically making wire chain of the character described, the combination of the head capable of rotatory and lengthwise movements and provided with a recess open through the bottom of said head and with a horizontally disposed groove within the walls of said recess, means for forming the link with one end of the same finally disposed within said recess, means for turning said head in reverse directions whereby succeeding finished links are turned from a horizontal plane to a vertical plane in reverse directions preparatory to threading the wire blanks for succeeding links, means for withdrawing the completed links from said head after said threading, and means for turning said head to its normal position with said groove in a horizontal plane intermediate of said reverse turning of the head preparatory to threading succeeding links, substantially as set forth.

15. The combination of the shaft 91 journaled in suitable boxes rising from the bed of the machine, the spur gear carried by said shaft, the main shaft carrying a pinion meshing with said gear the diameter of the latter being double the diameter of the former, the cam 7 carried by the shaft 91 and having within its side a groove composed of diametrically opposite long dwells and diametrically opposite short dwells at right angles to the first mentioned dwells, said groove extending outwardly from the center of the cam to connect the long dwells with one of the short dwells, and inwardly toward said center to connect the long dwells with the other short dwell, the rack bar capable of sliding within suitable ways on the bed of the machine and carrying a roller which extends laterally within said groove, and the shaft 87 journaled in suitable boxes supported on the bed and carrying at its outer end a pinion which meshes with said rack bar and having secured upon its inner end the bending head 101, substantially as set forth.

In testimony whereof I affix my signature in presence of two witnesses.

CHARLES F. SMITH.

Witnesses:
F. W. SMITH, Jr.,
M. T. LONGDEN.